(12) United States Patent
Nichols

(10) Patent No.: US 6,427,863 B1
(45) Date of Patent: Aug. 6, 2002

(54) BABY BOTTLE WARMER

(76) Inventor: Karen Nichols, 100 Cannonball Dr., Tinton Falls, NJ (US) 07753

( * ) Notice: Subject to any disclaimer, the term of this patent is extended or adjusted under 35 U.S.C. 154(b) by 0 days.

(21) Appl. No.: 10/038,190

(22) Filed: Dec. 29, 2001

(51) Int. Cl.$^7$ .............................................. B65D 21/00
(52) U.S. Cl. ................... 220/592.17; 220/23.86
(58) Field of Search ....................... 220/592.17, 592.16, 220/592.27, 23.86, 23.91; 165/80.5

(56) References Cited

U.S. PATENT DOCUMENTS

| | | | | |
|---|---|---|---|---|
| 2,828,043 A | * | 3/1958 | Hosford, Jr. ....... | 220/592.27 X |
| 2,836,323 A | * | 5/1958 | Robinson .................... | 220/4.27 |
| 3,384,259 A | * | 5/1968 | Hoffstadt .................... | 220/4.27 |
| 3,684,123 A | * | 8/1972 | Bridges ................. | 220/592.17 |
| 5,014,040 A | | 5/1991 | Weaver et al. | |
| 5,086,926 A | * | 2/1992 | Paige et al. ............ | 220/4.27 X |
| 5,329,778 A | * | 7/1994 | Padamsee .......... | 220/592.16 X |
| 5,652,570 A | | 7/1997 | Lepkofker | |
| D388,720 S | | 1/1998 | Montgomery | |
| 5,931,334 A | * | 8/1999 | Sartore .................. | 220/592.16 |
| 5,975,337 A | * | 11/1999 | Hadley .................. | 220/592.17 |
| 647,925 A | * | 4/2000 | Kirby .................... | 220/4.27 X |

* cited by examiner

Primary Examiner—Steven Pollard
(74) Attorney, Agent, or Firm—Matthew J. Peirce, Esq.

(57) ABSTRACT

A new and improved product for heating up baby bottles in a very convenient and quick manner is disclosed. The product comprises a thermos base that includes an insulated cup which can be threadably attached to the thermos base. A user would place hot water within the thermos before going to somewhere, and then would be able to remove the insulated cup and pour water from the thermos into the insulated cup when they would need to warm a baby bottle. The baby bottle would then be placed into the hot water in the insulated cup and the thermos would be closed to keep any remaining water hot.

4 Claims, 1 Drawing Sheet

BABY BOTTLE WARMER

I. BACKGROUND OF THE INVENTION

The present invention concerns that of a new and improved product for heating up baby bottles in a very convenient and quick manner.

II. DESCRIPTION OF THE PRIOR ART

U.S. Pat. No. D388,720, issued to Montgomery, discloses an ornamental design for a combined transmitter and receiver for locating lost individuals.

U.S. Pat. No. 5,652,570, issued to Lepkofker, discloses an interactive individual location and monitoring system which includes a central monitoring system for maintain health, location, and other data with respect to an individual.

U.S. Pat. No. 5,014,040, issued to Weaver et al., discloses a personal locator transmitter adapted to be worn on the wrist and having the size and appearance of a conventional wrist-watch.

III. SUMMARY OF THE INVENTION

The present invention concerns that of a new and improved product for heating up baby bottles in a very convenient and quick manner. The product comprises a thermos base that includes an insulated cup which can be threadably attached to the thermos base. A user would place hot water within the thermos before going to somewhere, and then would be able to remove the insulated cup and pour water from the thermos into the insulated cup when they would need to warm a baby bottle. The baby bottle would then be placed into the hot water in the insulated cup and the thermos would be closed to keep any remaining water hot.

There has thus been outlined, rather broadly, the more important features of a product for heating up baby bottles in order that the detailed description thereof that follows may be better understood and in order that the present contribution to the art may be better appreciated. There are, of course, additional features of the product for heating up baby bottles that will be described hereinafter and which will form the subject matter of the claims appended hereto.

In this respect, before explaining at least one embodiment of the product for heating up baby bottles in detail, it is to be understood that the product for heating up baby bottles is not limited in its application to the details of construction and to the arrangements of the components set forth in the following description or illustrated in the drawings. The product for heating up baby bottles is capable of other embodiments and being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present product for heating up baby bottles. It is important, therefore, that the claims be regarded as including such equivalent constructions insofar as they do not depart from the spirit and scope of the present invention.

It is therefore an object of the present invention to provide a product for heating up baby bottles which has all of the advantages of the prior art and none of the disadvantages.

It is another object of the present invention to provide a product for heating up baby bottles which may be easily and efficiently manufactured and marketed.

It is another object of the present invention to provide a product for heating up baby bottles which is of durable and reliable construction.

It is yet another object of the present invention to provide a product for heating up baby bottles which is economically affordable and available for relevant purchasing government entities.

Other objects, features and advantages of the present invention will become more readily apparent from the following detailed description of the preferred embodiment when considered with the attached drawings and appended claims.

IV. BRIEF DESCRIPTION OF THE DRAWINGS

V. DESCRIPTION OF THE PREFERRED EMBODIMENT

Figure 1:
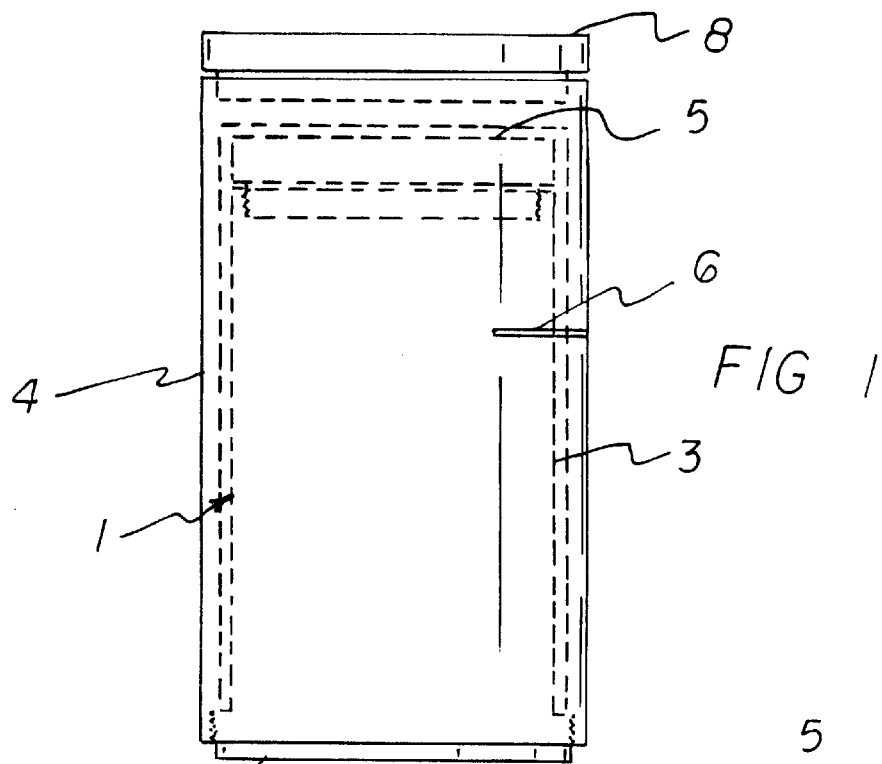
FIG. 1 shows a front view of the present invention.

FIG. 1 shows a front view of the present invention. The present invention concerns that of a new and improved product for keeping baby bottles warmer for a longer period of time. The product comprises an internal thermos 1 which includes a base 2 and a continuous side wall 3 attached to the top of the thermos base 2. The present invention also includes a thermos top 5 that could be threadably attached to the top of the continuous side wall 3. The base 2 would be fabricated from a non-slip material.

The present invention also includes an insulated cup 4 which can be screwed onto and over the thermos base 2. The insulated cup 4 would almost as tall as the thermos itself but would have a diameter larger than that of the continuous side wall 3. When not in use, the insulated cup 4 would be placed upside-down over the thermos 1 with the "top" of the cup 4 sitting in a bottom-like position. The top of the cup 4 would screwed onto the outer perimeter of the top side of base 2.

The present invention also includes a top-mounted cap 8 which can be snapped onto the "bottom" of insulated cup 4 when it would be attached to the base 2 (with the "bottom" in this instance sitting in a top-like position). Cap 8 would be used for the top of the cup when the cup 4 would be removed from the base 2 and filled with hot water. Cap 8 would include a plurality of vent holes 10 which would allow steam from hot water located in insulated cup 4 to escape.

Figure 2:
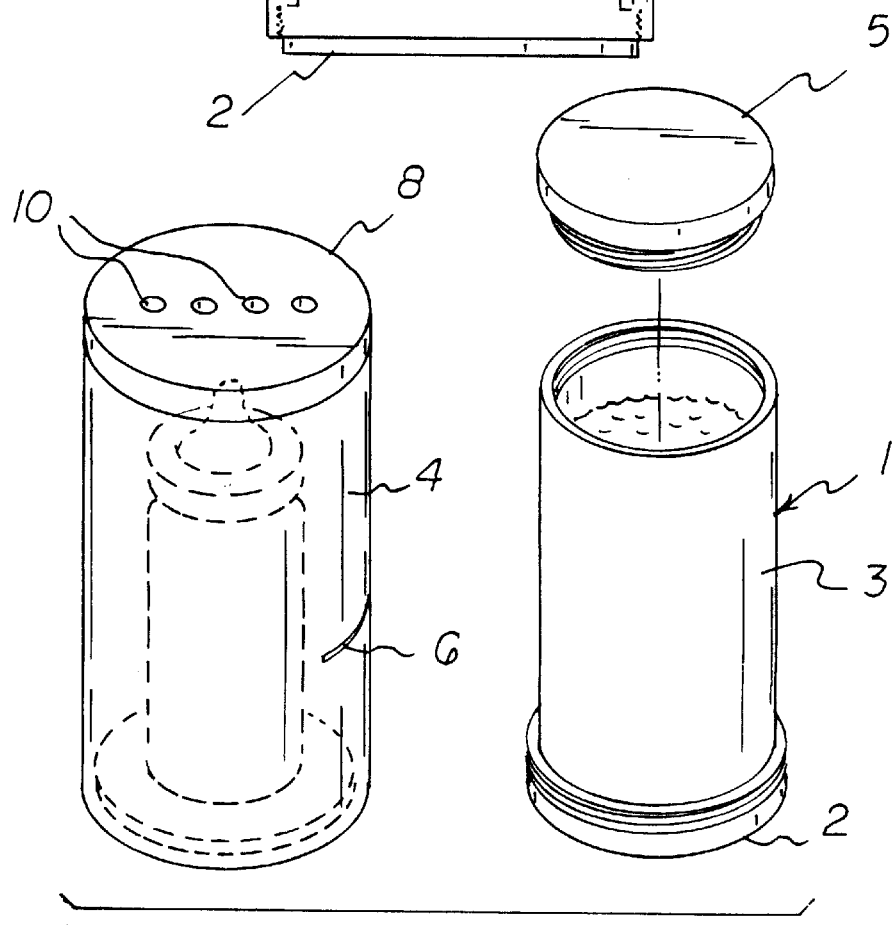
FIG. 2 shows a perspective view of the present invention in use.

FIG. 2 shows a perspective view of the present invention in use. When a user would want to use the present invention, he would remove the top-mounted cap 8 and set it aside. Then, the user would remove the insulated cup 4 from the base 2 and remote the thermos top 5. The cup 4 would then be placed right side up. The user would then pour hot water into the insulated cup 4 to the fill-up line 6, which would allow a user to fill insulated cup 4 to the proper level with hot water. Then, a user would take a baby bottle to be heated and place it within the volume hot water within the insulated cup 4. Then, the user would snap on the top-mounted cap 8 on the top of the insulated cup 4 and place the thermos top 5 back onto the thermos base 4 to keep the remaining water hot. The user would then warm the bottle to the desired temperature and could reuse any hot water if needed.

What I claim as my invention is:

1. An apparatus for warming baby bottles comprising:
    (a) a thermos, the thermos comprising a circular base, the base having two surfaces, a top surface and a bottom surface, the thermos further comprising a continuous side wall, the continuous side wall having a bottom edge and top edge, the bottom edge of the continuous side wall fixedly attached to the base, the continuous side wall having two surfaces, an inner surface and an outer surface, (b) a top threadably attached to the top edge of the continuous side wall, (c) an insulated cup having a circular open top, the circular open top being threadably attached to the circular base of the thermos, the diameter of the circular open top of the insulated cup being greater than the diameter of the circular base of the thermos, the insulated cup being located out side the continuous side wall of the thermos when threadably attached to the circular base of the thermos, the insulated cup further having two surfaces, an inner surface and an outer surface, (d) a volume of water placed within the thermos, (e) a cup cap removably attached to the bottom of the insulated cup when the insulated cup is attached to the base of the thermos, (f) whereby a user could warm up the volume of infant formula or milk within the baby bottle by removing the cup cap, further whereby the user would unscrew the insulated cup, placed the insulated cup right-side up, and unscrew the thermos top, further whereby the user would pour hot water from the thermos into the insulated cup, further whereby a user would place the baby bottle into the volume of hot water located within the insulated cup, further whereby the user would place the cup cap over the top of the insulated cup until the baby bottle reached a desired temperature.

2. An apparatus for warming baby bottles according to claim 1 wherein the cup cap would further comprise a plurality of holes dispersed through the cup cap.

3. An apparatus for warming baby bottles according to claim 1 wherein the insulated cup further comprises a fill line to designate the proper volume of water to be poured into the insulated cup.

4. An apparatus for warming baby bottles according to claim 1 wherein the base of the thermos would be fabricated from a non-slip surface.

* * * * *